United States Patent
Yoshida

(10) Patent No.: US 6,930,716 B2
(45) Date of Patent: Aug. 16, 2005

(54) IMAGING APPARATUS CAPABLE OF ADDING TOGETHER SIGNAL CHARGES FROM PIXELS AND READING OUT THE ADDED PIXEL SIGNALS

(75) Inventor: Hideaki Yoshida, Hachioji (JP)

(73) Assignee: Olympus Corporation (JP)

(*) Notice: Subject to any disclaimer, the term of this patent is extended or adjusted under 35 U.S.C. 154(b) by 732 days.

(21) Appl. No.: 09/773,713

(22) Filed: Jan. 31, 2001

(65) Prior Publication Data

US 2001/0010554 A1 Aug. 2, 2001

(30) Foreign Application Priority Data

Jan. 31, 2000 (JP) ........................................ 2000-022758
Apr. 19, 2000 (JP) ........................................ 2000-117738

(51) Int. Cl.[7] ........................ H04N 5/335; H04N 5/235
(52) U.S. Cl. ........................ 348/322; 348/312; 348/362
(58) Field of Search ............................... 348/312, 311, 348/314, 322, 323, 324, 296, 297, 294, 362, 273, 272

(56) References Cited

U.S. PATENT DOCUMENTS

| | | | | |
|---|---|---|---|---|
| 4,730,213 A | * | 3/1988 | Kelly et al. ................. | 348/135 |
| 5,420,629 A | * | 5/1995 | Watanabe ................. | 348/230.1 |
| 5,500,675 A | * | 3/1996 | Arakawa et al. ............ | 348/319 |
| 5,786,852 A | * | 7/1998 | Suzuki et al. ............... | 348/312 |
| 6,463,167 B1 | * | 10/2002 | Feldman et al. ............ | 382/128 |
| 6,480,226 B1 | * | 11/2002 | Takahashi et al. .......... | 348/296 |
| 6,594,038 B1 | * | 7/2003 | Ikeda ......................... | 358/486 |
| 6,661,451 B1 | * | 12/2003 | Kijima et al. ............ | 348/220.1 |
| 6,686,960 B2 | * | 2/2004 | Iizuka ........................ | 348/273 |

* cited by examiner

*Primary Examiner*—James J. Groody
*Assistant Examiner*—Lin Ye
(74) *Attorney, Agent, or Firm*—Ostrolenk, Faber, Gerb & Soffen, LLP

(57) ABSTRACT

A color imaging apparatus includes a CCD imaging device having interline transfer charge transfer paths adapted for interlaced reading and a Bayer-arranged color filter. The apparatus can be put in either of normal shooting mode and high-sensitivity shooting mode. In the high-sensitivity mode, pixel signals from two pixels arranged in the vertical direction in each photosensitive CCD array are transferred by a corresponding vertical transfer path at two times the rate in the normal mode to a horizontal transfer path where they are added together. A line of pixel signals from the horizontal transfer path is output to a preprocess circuit where pixel signals separated by one pixel in the horizontal direction are added together. This process produces a line of image signal.

10 Claims, 3 Drawing Sheets

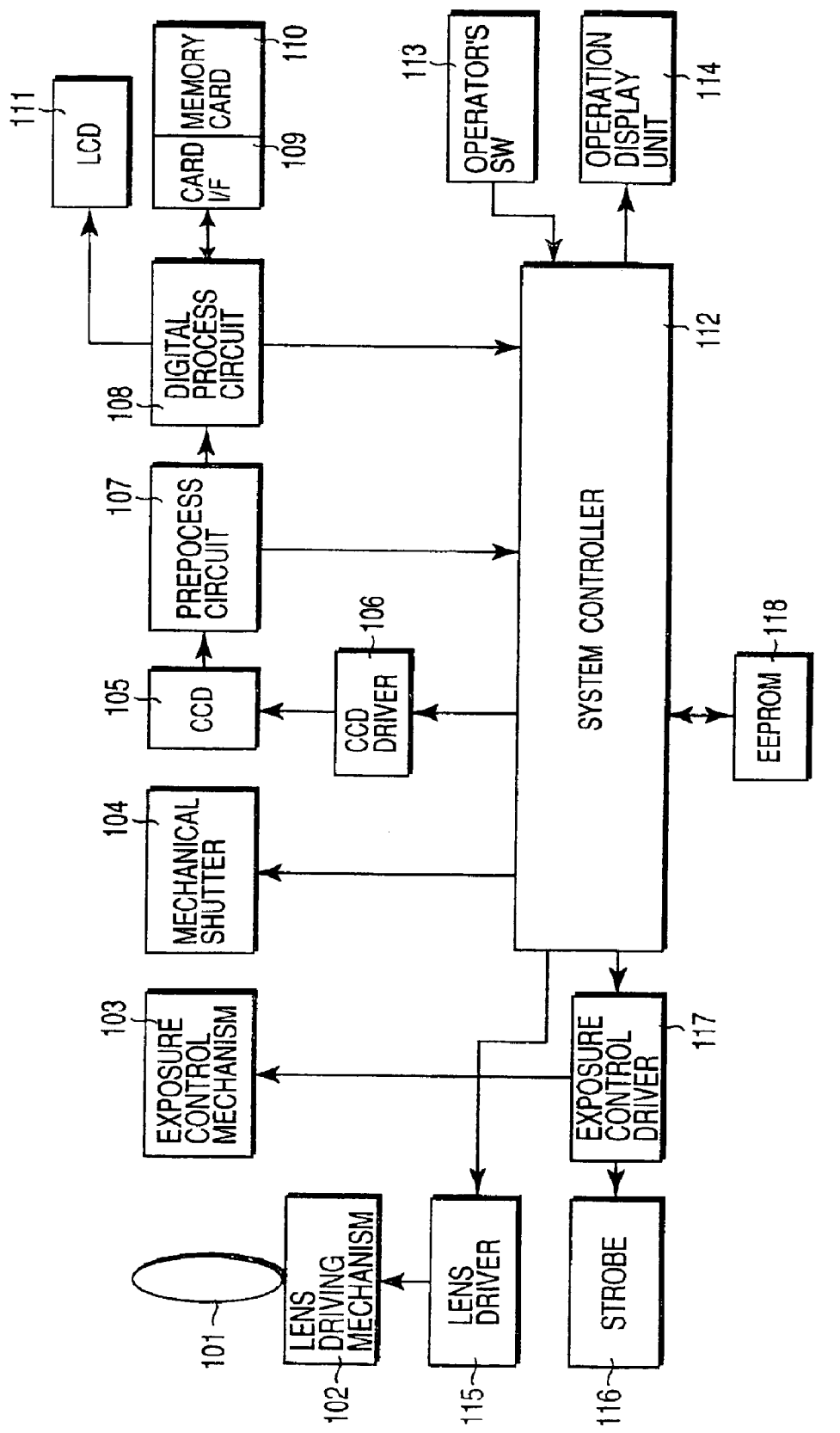
F I G. 1

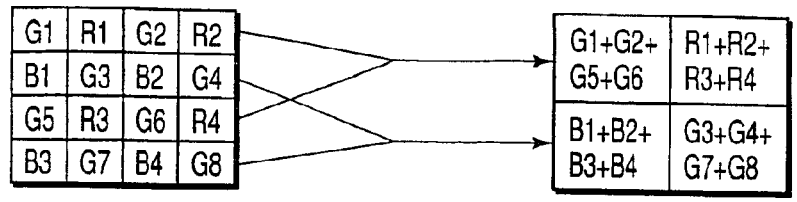
FIG. 4
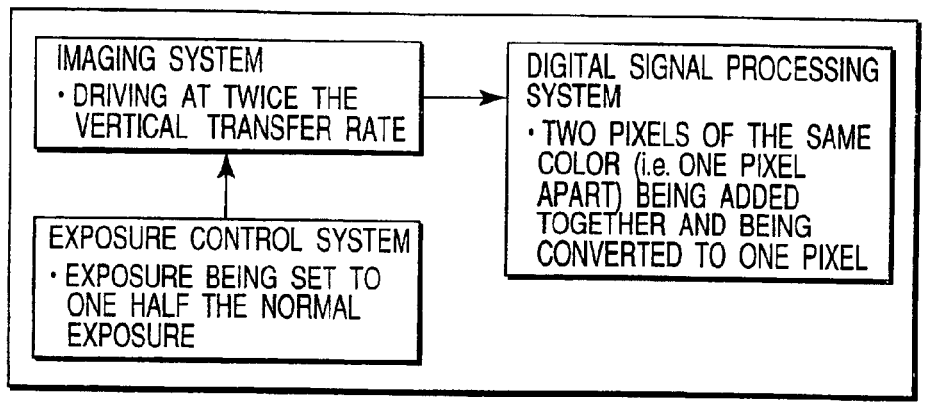
FIG. 5
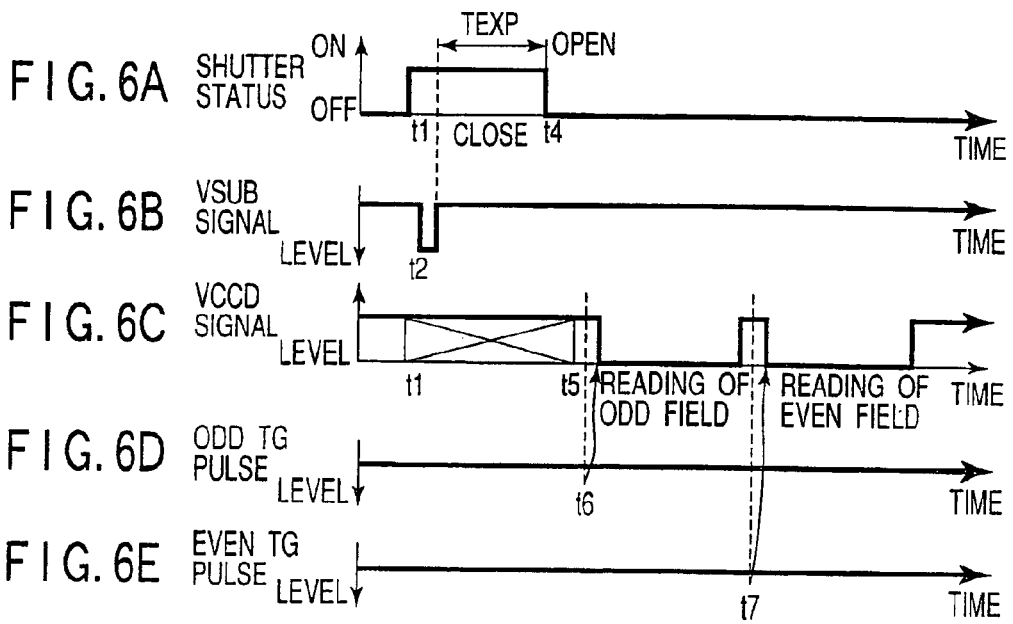

IMAGING APPARATUS CAPABLE OF ADDING TOGETHER SIGNAL CHARGES FROM PIXELS AND READING OUT THE ADDED PIXEL SIGNALS

CROSS-REFERENCE TO RELATED APPLICATIONS

This application is based upon and claims the benefit of priority from the prior Japanese Patent Applications No. 2000-022758, filed Jan. 31, 2000; and No. 2000-117738, filed Apr. 19, 2000, the entire contents of which are incorporated herein by reference.

BACKGROUND OF THE INVENTION

The present invention relates to an imaging apparatus which has an image pick-up device, such as a CCD, built in, and more specifically to an image apparatus which permits the device sensitivity to be increased by adding together signal charges produced from pixels in the device.

The present invention also relates to an imaging apparatus which uses a color image pick-up device having a color filter of Bayer arrangement, and more specifically to an image apparatus which permits the device sensitivity to be increased by adding together signal charges produced by pixels in the device.

In recent years, digital still cameras as an electronic imaging apparatuses (i.e., electronic cameras) have been intensively developed which are adapted to capture the image of a subject on the built-in image pick-up device (hereinafter referred to as the imaging device), such as a CCD, and produce a corresponding still or video image signal to reproduce the image. In recent digital cameras, the number of pixels are so increased as to have an improved image quality, but it is still required that shots be continuously taken at short time intervals. Accordingly, it is necessary to improve a circuit system of processing an image so as to satisfy the above requirement. That is, there is required an improved method of reading an image formed on an imaging device having an increased number of pixels at a high speed-reading rate and a high frame transfer rate. To achieve the requirement, in such imaging apparatuses, for example, in still-image or moving-image apparatuses, it is said that, though image resolution is reduced, the sensitivity of the imaging device can be increased by adding together signal charges from adjacent pixels of same color, for example, a total of four pixels: two pixels of same color adjacent to each other in the vertical direction and two pixels of same color adjacent to each other in the horizontal direction.

Specific methods for adding together signal charges include external digital addition by which each signal charge, i.e., each pixel signal, is sequentially read from the imaging device in accordance with standard techniques and then subjected to analog-to-digital conversion and the resulting digital pixel signals are added together in digital circuitry and internal analog addition by which analog signal charges are added together as they are on transfer paths in the CCD imaging device. The internal analog addition requires some modifications to be made to the transfer-driving scheme of the imaging device.

These techniques applied to digital cameras may possibly result in an increase in the sensitivity of the imaging device. However, noise is produced at the time of addition, increasing noise in the image signal. This may cause degradation in image quality in addition to degradation in resolution due to a reduced number of effective pixels.

Some conventional publications describe that, when signal charges from four pixels are added together, the sensitivity of the imaging device is apparently increased by a factor of four. That is not necessarily correct in view of noise produced in the imaging device. The reason is as follows: The effect of improving the SN ratio by adding together signal charges is known to be proportional to the square root of the number of signals to be added together from statistical properties of random noise. Although the signal level is increased by four times by adding together signals from four pixels, the SN ratio can only be expected to increase by a factor of two (i.e., 6 dB). When shooting is made with the image quality, i.e., the noise level, kept, therefore, the sensitivity can only be increased, at a maximum, by a factor of two, in other words, the exposure can only be reduced, at a maximum, by a factor of two. If, to obtain four times the sensitivity, shooting were made at one-quarter the exposure and signals from four pixels ware added together, the signal level S would be increased by a factor of ¼×4=1 and the noise component would be increased by a factor of $$1 \times \sqrt{4} = 2,$$

resulting in a reduction of 6 dB in the SN ratio.

Consider here that the imaging device is exposed at one-half the exposure in the case where signals from four pixels are added together. With the external digital addition, each signal from the imaging device is at a level of ½ and hence the noise level is relatively increased by a factor of two. Analog (random) noise is reduced by a factor of $$1/\sqrt{4} = 2$$

by the subsequent addition of signals from four pixels. There is therefore no problem with respect to the random noise. On the other hand, quantization noise is not reduced even by the signal addition and remains at a relative level of two, causing degradation in image quality as described previously. With the external digital addition, the frame rate remains unchanged from that in normal shooting mode and cannot be increased and moreover digital operations must be performed in two dimensions, increasing the signal processing time for recording.

On the other hand, the analog addition processing involves a problem of saturation of charges within the imaging device, because the saturated charge amount is limited at predetermined values in the charge transfer path and an output section of the imaging device. That is, the maximum output level of the horizontal transfer path on which signal charges are added together or the output amplifiers of the imaging device in the normal read operation is limited to the amount of charge for one pixel. However, the addition of signals from four pixels at one-half the exposure requires the amount of charge for two (=½×4) pixels to be handled. This increase in the amount of charge cannot be accommodated by the imaging device and hence signals will be clipped within the imaging device, causing the image quality to suffer.

Furthermore, since the addition of pixel charges within the imaging device is allowed for only signals from successive pixels, it is said that the application of internal addition processing to the one charged coupled device having a Bayer-arrangement color filter is difficult. The one charged coupled device have therefore to depend on a technique which involves reading pixel signals once, then adding together digital signals of the same color with a digital process outside the imaging device. The addition of pixel signal with external digital processing is complex and takes long because the operations must be performed two-dimensionally and does not allow for an improvement in the frame rate.

BRIEF SUMMARY OF THE INVENTION

It is an object of the present invention to provide an imaging apparatus which permits pixel signals to be added together without need of complex operation processing to increase the sensitivity and allow the frame rate to be increased.

It is another object of the present invention to provide an imaging apparatus which permits the frame rate to be increased without causing the image quality to suffer and the shooting sensitivity to be increased by adding together pixel signals without increasing the burden of digital signal processing.

It is still another object of the present invention to provide an imaging apparatus which, even with a Bayer arrangement color imaging device incorporated, permits the frame rate to be increased and the sensitivity to be increased by adding together pixel signals without need of complex operation processing.

According to an aspect of the present invention there is provided an apparatus comprising: a color imaging device having interline transfer charge transfer paths adapted for interlaced readout and a Bayer-arrangement color filter; driving means for driving the imaging device which, in addition to normal signal read operation, allows addition readout for reading signals while adding together signal charges from a plurality of pixels arranged in the vertical direction in the charge transfer paths; addition operation means for performing addition operation of a plurality of pixels arranged in the horizontal direction on pixel signals read from the imaging device; and mode setting means for setting selectively one of a first shooting mode corresponding to the normal readout operation of the imaging device and a second shooting mode, when the second shooting mode is set by the mode setting means, the driving means performing the addition readout on the plurality of pixels in the vertical direction and the addition operation means performing addition processing on alternate pixels in the horizontal direction.

This imaging apparatus may be implemented specifically and preferably as follows:

(1) The number of pixels to be added together in the second shooting mode by each of the drive means and addition operation means is the same.

(2) There is further provided exposure control means for controlling the amount of light falling on the imaging device. When the number of pixels to be added together by each of the drive means and addition operation means is N, the exposure control means sets the target exposure value in the second shooting mode to 1/N the target value in the first shooting mode.

(3) In the second shooting mode, the driving means drives vertical transfer paths in the imaging device at twice the rate in the first shooting mode so that signal charges from two pixels arranged in the vertical direction are added together in the horizontal transfer path.

(4) The color filter used with the imaging device is an RGB primary color filter.

(5) The imaging device is a CCD imaging device.

According to the present invention, with the Bayer-arrangement imaging device adapted for interlaced frame readout, alternate pixels arranged in the vertical direction and corresponding to either of odd and even fields making up one frame are of the same color and alternate pixels arranged in the horizontal direction, i.e., along each line, are of the same color. Therefore, pixels arranged in the vertical direction can be readily added together in the horizontal transfer path. For example, driving the vertical transfer paths at twice the normal rate allows two pixels arranged in the vertical direction to be added together in the horizontal transfer path.

After the pixel addition in the vertical direction in the horizontal transfer path, pixel addition is performed on alternate pixels in the horizontal direction outside the image device. In this case, one-dimensional addition operation suffices, allowing the signal processing to be simplified significantly in comparison with two-dimensional addition operation. The pixel addition in the vertical direction within the imaging device allows the frame rate to be increased.

According to another aspect of the present invention there is provided an apparatus comprising: a color imaging device having an interline transfer charge transfer paths; driving means for driving the imaging device which, in addition to normal signal read operation, allows addition readout for reading signals while adding together signal charges from a plurality of pixels arranged in the vertical direction in the charge transfer paths; addition operation means for performing addition operation of a plurality of pixels arranged in the horizontal direction on pixel signals read from the imaging device; and mode setting means for setting selectively one of a first shooting mode corresponding to the normal readout operation of the imaging device and a second shooting mode, when the second shooting mode is set by the mode setting means, the driving means performing the addition readout on the plurality of pixels in the vertical direction and the addition operation means performing addition processing on alternate pixels in the horizontal direction.

According to still another aspect of the present invention there is provided an apparatus comprising: a color imaging device having an interline transfer charge transfer paths adapted for interlaced readout and a Bayer-arrangement color filter; driving means for driving the imaging device which, in addition to normal signal read operation, allows addition readout for reading signals while adding together signal charges from a plurality of pixels arranged in the vertical direction in the charge transfer paths; addition operation means for performing addition operation of a plurality of pixels arranged in the horizontal direction on pixel signals read from the imaging device; and mode setting means for setting selectively one of a first shooting mode corresponding to the normal readout operation of the imaging device and a second shooting mode, when the second shooting mode is set by the mode setting means, the driving means performing the addition readout on the plurality of pixels in the vertical direction and the addition operation means performing addition processing on alternate pixels in the horizontal direction.

The imaging apparatus of the present invention may be implemented specifically and preferably as follows:

(1) The number of pixels to be added together in the second shooting mode by each of the drive means and addition operation means is the same.

(2) The number of pixels to be added together in the second shooting mode by each of the drive means and addition operation means is an integer of N not less than two.

(3) There is further provided exposure control means for controlling the amount of light falling on the imaging device. The exposure control means sets the target exposure value in the second shooting mode to a value not more than 1/N of the target value in the first shooting mode, especially to 1/N.

(4) In the second shooting mode, the driving means drives vertical transfer paths in the imaging device at twice the rate in the first shooting mode so that signal charges from two pixels arranged in the vertical direction are added together in the horizontal transfer path.

(5) In the second shooting mode, the output of the addition operation means, after being reduced by a factor of N, is subjected to the same video signal processing as in the first shooting mode is performed except processing as to the number of pixels.

(6) The color filter used with the imaging device is an RGB primary color filter.

(7) The imaging device is a CCD imaging device.

According to the present invention, pixel addition in the vertical direction is performed through driving means and pixel addition in the horizontal direction is performed through external operations means. In this case, the external circuit is required to perform one-dimensional addition operation only, allowing signal processing to be simplified significantly in comparison with two-dimensional addition operation. Also, the pixel addition in the vertical direction within the imaging device allows the frame rate to be increased.

Since only the addition in the vertical direction is performed in the device, the problem of in-device signal saturation is alleviated in comparison with the case where two-dimensional addition is performed in the device.

When the target exposure value for the imaging device is set to not more than 1/N (N is the number of vertically-arranged pixels to be added together), the amount of charge at the time of addition in the device will not exceed the amount of charge for one pixel in the normal mode and there will not arise a new problem of signal saturation in the imaging device (for subject brightness level lower than the normal). If the target exposure is set to 1/N even when the number of pixels to be added together in the horizontal direction is N, the effect of reducing noise by the total addition processing will not fall below the degree of a reduction in signal components. Thus, the S/N ratio will also not be degraded.

With the Bayer-arrangement imaging device adapted for interlaced frame readout, alternate pixels arranged in the vertical direction and corresponding to either of odd and even fields making up one frame are of the same color and alternate pixels arranged in the horizontal direction, i.e., along each line, are of the same color. Therefore, pixels arranged in the vertical direction can be readily added together in the horizontal transfer path. For example, driving the vertical transfer paths at twice the normal rate allows two pixels arranged in the vertical direction to be added together in the horizontal transfer path.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram of a digital still camera according to an embodiment of the present invention;

FIG. 4 is a diagram for use in explanation of the addition of signals from four pixels in the imaging apparatus equipped with the RGB Bayer-arrangement color filter shown in FIG. 3;

FIG. 5 is a schematic functional block diagram illustrating control functions implemented by the system controller in the imaging apparatus shown in FIG. 1; and FIGS. 6A through 6E are timing diagrams for use in explanation of the shutter release operation and the charge read operation in the imaging apparatus shown in FIG. 1.

DETAILED DESCRIPTION OF THE INVENTION

Figure 2:
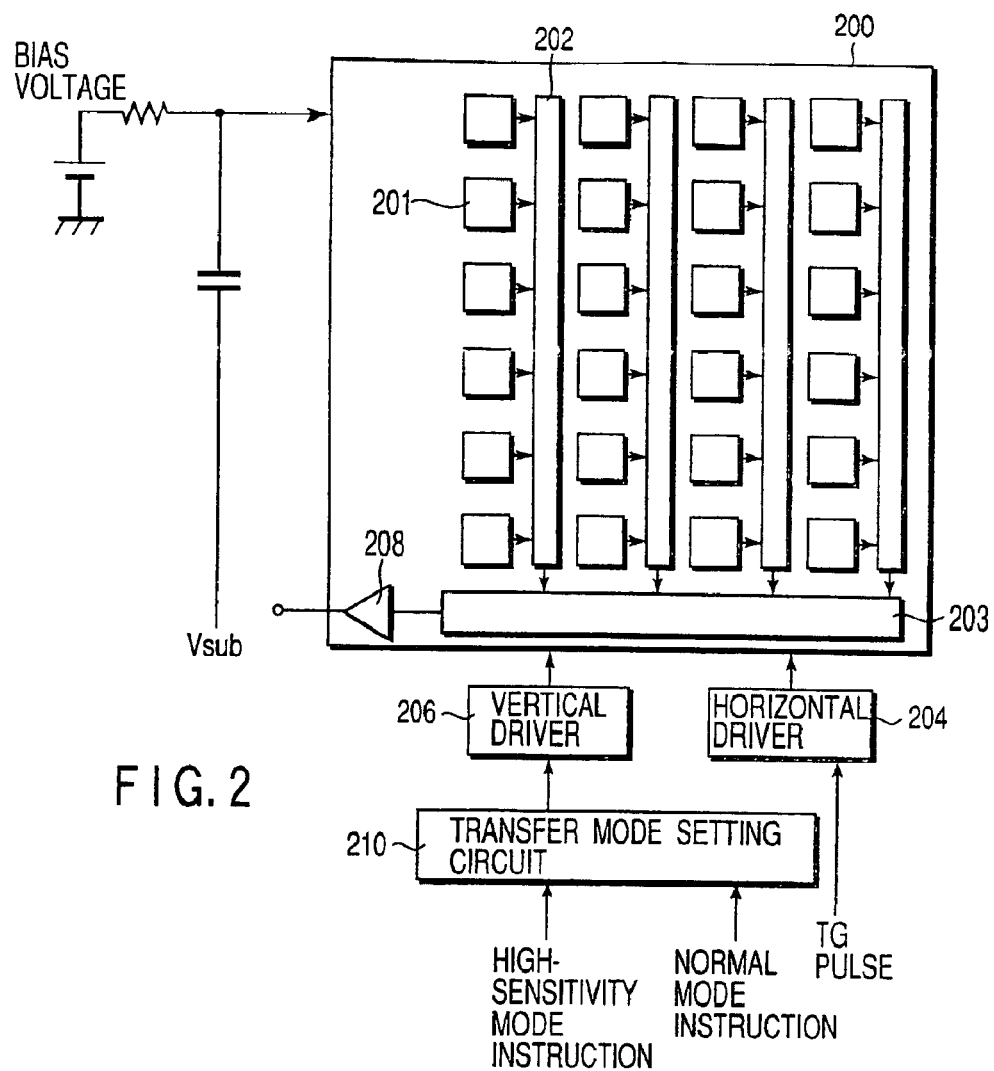
FIG. 2 schematically illustrates, in plan view, the basic structure of the color imaging device shown in FIG. 1.

Referring now to FIG. 1 there is illustrated, in block diagram form, a digital still camera as an imaging apparatus according to an embodiment of the present invention.

In FIG. 1, an objective lens system 101 is composed of multiple lenses, which direct light rays from a subject into the camera. The lens system 101 is driven by a lens drive mechanism 102 so that it is focused on the subject. An exposure control mechanism 103, including an aperture and an aperture drive mechanism, is provided to control the amount of incoming light passed through the lens system. The light passed through the aperture of the exposure control mechanism is directed through a mechanical shutter 104 onto a CCD color imaging device 105 equipped on its light receiving surface with a Bayer-arrangement color filter. Thus, the image of the subject is formed on the CCD color imaging device.

The CCD color imaging device 105 is driven by a CCD driver 106 which produces drive signals to be described later. From the CCD color imaging device are produced, for example, red (R), green (G) and blue (B) pixel signals which correspond to R, G and B filter elements, respectively, in the Bayer arrangement color filter. The resulting R, G and B pixel signals are fed into a preprocess circuit 107 including analog-to-digital (A/D) converters and so on, so that they are converted into digital form. The digital pixel signals from the preprocess circuit are then entered into a digital process circuit 108 where they are subjected to color signal production processing, matrix conversion processing and other digital processing to form color image data. The color image data is loaded through a card interface 109 into a memory card 110, such as a compact flash memory card or the like and is displayed as a color image on an LCD display unit 111.

The digital still camera of FIG. 1 is equipped with a system controller (CPU) 112 for controlling the components in the camera. When operating switches 113 including a shutter release button are operated, the system controller sets operating modes corresponding to the operated switches and then displays the operating states and the mode settings on an operation display unit 114 provided with a LCD or LED. As will be described later, operating the switches 113 allows a choice to be made between a normal shooting mode in which a subject is shot with the normal sensitivity and a high-sensitivity shooting mode in which the subject is shot with sensitivity higher than the normal sensitivity.

The system controller 112, in response to an operation of the release button corresponding to one of the operating switches 113, instructs the lens driver 115 to drive the lens 101 for focusing purpose by way of example, whereupon the lens drive mechanism 102 moves the lens 101. Thus, focusing is accomplished. In a similar way, zooming can also be performed. Further, the digital still camera is equipped with a flash unit 116 as light emitting means for directing a flash of light onto a subject, which is controlled by an exposure control driver 117 to direct an appropriate amount of light onto the subject. The system controller is connected with a nonvolatile memory (EEPROM) 118 for storing various settings and produces control signals in accordance with various parameters stored in that memory. The control signals are applied to the components in the camera.

In the digital still camera shown in FIG. 1, as described above, the system controller 112 controls the components. In particular, the system controller controls the shutter contained in the exposure control mechanism 103 through the exposure control driver 117 and the CCD imaging device 105 through the CCD driver 106 to carry out exposure (charge storage) and signal readout. The system controller allows the read signals to be fed through the preprocess circuit 107 into the digital process circuit 108, then subjects them to various signal processes and records them on the memory card 110 through the card interface 109. The CCD imaging device 105 substantially remains unchanged from conventional ones and is, for example, a vertical overflow drain structure of the interline transfer type.

In FIG. 2 are illustrated in block diagram form the CCD imaging device 106 and the CCD driver 106 shown in FIG. 1. The CCD imaging device is an interline transfer (IT) device and driven in accordance with the interlacing scheme. In the CCD imaging device 105, a large number of photodiodes 201, serving as pixels, are formed on a semiconductor substrate 200 so that they are arranged in a matrix form, i.e., in rows and columns. On the semiconductor substrate are formed vertical CCD arrays (VCCD) each of which forms a vertical transfer path 202 provided with transfer gate, that transfers charges received from a corresponding array of photodiodes in the vertical direction. A horizontal CCD array (HCCD), serving as a horizontal transfer path 203, is formed along the direction of arrangement of the photodiode arrays on the semiconductor substrate to transfer signal charges received from the vertical transfer paths 202 on a line-by-line basis in the horizontal direction.

As shown in FIG. 2, the vertical transfer path 202 provided with the transfer gate is alternately driven by odd and even transfer gate (TG) signals and VCCD signal supplied from a vertical driver 206 in such a manner that charge signals are alternatively read from the pixels arranged in odd field and even field, respectively, and the charge signals as pixel signals corresponding to one of the odd and even fields are transferred to the horizontal transfer path. The horizontal transfer path 203 is driven by a HCCD signal supplied from a horizontal driver to transfer the pixel signal in the horizontal transfer path 203 and output the pixel signal to the preprocess circuit 107 through an amplifier 208. The vertical driver 206 is set in a normal mode or high speed transfer mode by a transfer mode setting circuit 210. The transfer mode setting circuit 210 set the vertical driver in the normal mode in accordance with a normal mode instruction and in the high speed transfer mode in accordance with the high-sensitivity mode instruction.

Figure 3:
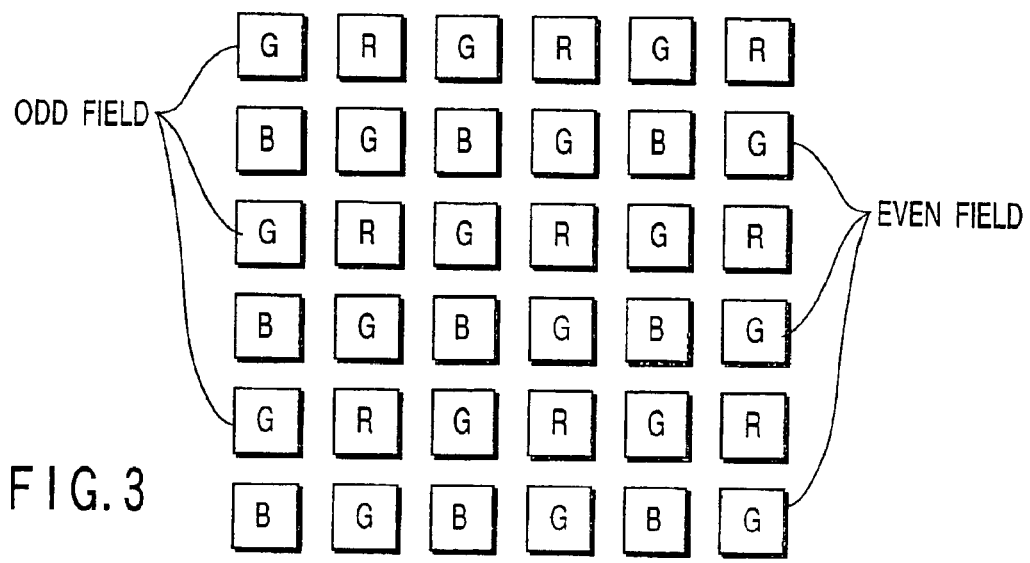
FIG. 3 schematically illustrates a Bayer arrangement of RGB filter elements in the color imaging device shown in FIG. 1.

As shown in FIG. 3, the Bayer arrangement color filter is formed with R, G and B filter elements in the Bayer arrangement. With such a Bayer arrangement color filter, the addition of signal charges from adjacent pixels results in different colors being mixed together. It is therefore impossible to mix signal charges from different pixels simply.

In the imaging device having R, G and B filter elements in the Bayer arrangement and adapted for interlacing, pixels corresponding to R and G filter elements or pixels corresponding to G and B filter elements are arranged in the form of a stripe in each interlace field. That is, in the odd field, pixels corresponding to R filter elements are arranged alternately with pixels corresponding to G filter elements, whereas, in the even field, pixels corresponding to G filter elements are arranged alternately with pixels corresponding to B filter elements.

In this embodiment, in the normal shooting mode in which the pixel signals from the same color pixels are not added, signal charges from pixels in the even and odd fields are read out alternately onto the vertical transfer paths 202 and then transferred to the horizontal transfer path 203 at the normal readout rate. That is, in reading out a frame of image in the interlacing system, signal charges from n pixels in the odd or even field are read out onto the vertical transfer paths 202 and then transferred to the horizontal transfer path 203. Pixel signals read in the odd and even fields and output from the horizontal transfer path 203 are processed as one frame of image data.

On the other hand, in the high-sensitivity shooting mode in which the pixel signals from the same color pixels are added, signal charges from pixels in the even and odd fields are read out alternately onto the vertical transfer paths 202 and then transferred to the horizontal transfer path 203 at n times the normal transfer rate. That is, n-line addition driving is carried out. Thereby, the signal charges from pixels are added together in the horizontal transfer path without different colors being mixed. Specifically, signal charges from n pixels arranged in the vertical direction and corresponding to the even or odd field are read out onto each vertical transfer path 202 and then moved into to the horizontal transfer path 203 where they are mixed together. Pixel signals for one frame read out of the horizontal transfer path 203 are subjected to digital operations such that signals from n pixels of the same color along each line in one frame are added together and then averaged and are converted into one frame of image data.

As described above, according to the invention, both of analog and digital additions are performed in the imaging apparatus, the analog addition of the pixel signals readout in the vertical direction of the pixel array being achieved in the imaging device and digital addition of the pixel signals transferred in the horizontal direction of the pixel array is achieved outside of the imaging device.

An example of addition of signal charges from four pixels is illustrated in FIG. 4 in which one unit of sixteen pixels is shown, a plurality of units of sixteen pixels constituting all the pixels of the imaging device. As shown, in the odd field, signal charges from two pixels of the same color (G or R) arranged in the vertical direction are added together in the horizontal transfer path 203. Likewise, in the even field as well, signal charges from two pixels of the same color (B or G) arranged in the vertical direction are added together in the horizontal transfer path 203. The pixel signals read from the horizontal transfer path to the outside of the imaging device are subjected to digital operations processing so that signals from two pixels of the same color along each line are added together and then averaged. With the addition of four pixels, the exposure used in shooting is set to one-half the normal exposure.

There will be described an addition of pixel signals in the imaging device composed of the units of sixteen pixels, one unit of the sixteen pixels being shown in FIG. 4, when a frame is read out in the interlacing manner, odd lines in the odd field are read first and even lines in the even field are read next. In the odd field, therefore, the pixel signal G1 and the pixel signal G5 are transferred to the first vertical transfer path 202 and the pixel signal R2 and the pixel signal R3 are transferred to the second vertical transfer path 202. Also, the pixel signal G2 and the pixel signal G6 are transferred to the third vertical transfer path 202 and the pixel signal R2 and the pixel signal R4 are transferred to the fourth vertical transfer path 202. In the horizontal transfer path, the pixel signals G1 and G5 are added together to produce a sum signal (G1+G5). Likewise, the pixel signals R1 and R3 are added together to produce a sum signal (R1+R3), the pixel signals G2 and G6 are added together to produce a sum signal (G2+G6), and the pixel signals R2 and R4 are added together to produce a sum signal (R2+R4). These sum signals are transferred to the outside of the imaging device. Outside the imaging device, two sum signals of the same color along the same line are added together to yield pixel signals {(G1+G5)+(G2+G6)} and {(R2+R4)+(R1+R3)}. Likewise, in the even field, pixel signals (B1+B3), (G3+G7), (B2+B4) and (G4+G8) are produced in the horizontal transfer path 203. Outside the imaging device, signals {(B1+B3)+(B2+B4)} and {(G3+G7)+(G4+G8)} are produced. Thus, the addition of signals from four pixels is achieved.

The above processing can be implemented as shown in FIG. 5. That is, in the imaging system corresponding to the CCD 105 of FIG. 1, the vertical transfer paths 202 are driven by the vertical drive pulse supplied from the CCD driver 106 at twice the vertical transfer rate in the normal mode so that signal charges from two pixels arranged in the vertical direction are transferred to the horizontal transfer path at different timing and are added together in the horizontal transfer path 203. In the digital signal processing circuit system corresponding to the digital process circuit 108, signals output from the horizontal transfer path are processed in such a way that two pixels of the same color which are arranged along each line which are one pixel apart are added together. In the exposure control system corresponding to the exposure control mechanism 103 driven by the exposure control driver 117, the exposure for an image incident on the CCD 105 is set to one-half the normally set target exposure. It should be noted here that the horizontal transfer path 203 is operated in exactly the same manner as in the normal operation; thus, signals are transferred horizontally at the normal horizontal transfer rate by horizontal transfer signals from the CCD driver 106. Since the addition of pixels in the vertical direction has already been made, the digital signal processing system requires only the addition of pixels in the horizontal direction, i.e., one-dimensional addition, thus allowing the signal processing to be significantly simplified in comparison with two-dimensional addition.

The aforementioned two-line addition drive itself is a known technique and its detailed description is therefore omitted. In brief, the vertical drive pulses, while, in the normal operation, being output by the number corresponding to one transfer unit during each horizontal retrace period, are produced by the number corresponding to n transfer units during each horizontal retrace period. Thereby, signal charges from n pixels arranged in the vertical direction are transferred in each vertical transfer path and then added together in the horizontal transfer path.

The unit pixels thus obtained through addition has the Bayer arrangement as shown in the right-hand portion of FIG. 4. Thus, the subsequent brightness and color signal production processing can use exactly the same algorithm as without pixel addition except that the total number of pixels is reduced. When the final number of pixels to be added together is N×N, the number of pixels to be added together in the CCD is N, which corresponds to the final amount by which the sensitivity is increased (the amount by which S/N ratio is increased: random noise is in inverse proportion to the square root of the number of pixels subjected to addition and averaging from its statistical property). Thus, the target exposure value can be set to 1/N of the normal exposure value. Therefore, there arises no problem associated with saturation which can occur inside the imaging device (e.g., in the horizontal transfer path). For example, in the case of addition of four pixels, the exposure is allowed to be ½ the normal exposure. In other words, in order to prevent the S/N ratio from degrading, it is required that the effect of reducing noise be not counteracted by a reduction in the number of signal components and the exposure be not less than ½ (1/N) the normal exposure. On the other hand, in order to prevent the amount of charge resulting from addition of pixels in the vertical direction from exceeding the amount of charge for one pixel so that no saturation occurs within the imaging device, it is required that the exposure be not greater than ½ the normal exposure. One-half the normal exposure meets those requirements.

In the pixel addition mode, the amount of charge (voltage level) output from the CCD remains unchanged from that in the normal mode, causing no increase in quantization noise. That the amount of charge remains unchanged means that the aforementioned algorithm for brightness and color signal production processing is allowed to be exactly the same as that without pixel addition, including processing as to gain and gradations. Accordingly, the signal processing can be made common to the pixel addition mode and the normal mode.

Considering quantization noise, the gain of analog amplifiers in the conventional all-digital system may be set to twice the normal gain. In this case, analog amplifiers having a wide variable range are required. This requirement is difficult to meet. Even if such amplifiers could be used, there would arise new problems of noise due to gain control, etc.

Since the amount of charge (voltage level) at the output of the CCD remains unchanged, the analog amplifier gain needs not to be changed. Thus, no problem arises anew in connection with the analog system (including A/D). The digital addition has a noise reducing effect on noise produced in the analog system. Thus, high sensitivity can be attained with more certainty than with the all-digital system in which the gain of the analog system generally needs to be set higher than that at the time of normal sensitivity (in the normal mode in which no addition is performed) in order to keep quantization noise from increasing. In addition, successive shooting can also be performed utilizing the increased frame rate owing to readout at n times the normal speed.

Reference is made to timing diagrams of FIGS. 6A to 6E to describe a shutter releasing operation and a charge readout operation in the imaging apparatus of the present invention.

After the mechanical shutter 104 is made to open (time t1) as shown in FIG. 6A, the final charge drain pulse (VSUB) is applied to the CCD 105 at time t2as shown in FIG. 6B. As a result, residual charges are drained from the photodiodes, or pixels 201. After that, charge storage (exposure) is initiated in the CCD array, so that charges are stored in the photodiodes, or pixels 201. Until the shutter 104 is closed at time t4, the charges are stored in the photodiodes during a period Texp. The vertical CCD transfer paths 202 are driven during the interval from time t1 to time t5 as shown in FIG. 6C, so that unnecessary charges are drained from the vertical CCD transfer paths. From a predetermined time t6 immediately after the time t4 and the charge drain has been completed, odd-field transfer gate pulses are applied to the vertical transfer paths 202 as shown in FIG. 6D. As a result, signal charges in the photodiodes 201 corresponding to the odd field are read out to the vertical CCD transfer paths 202 and then transferred to the horizontal CCD transfer path 203. At this point, the signal charges from two pixels arranged in the vertical direction are added together in the horizontal transfer path. After that, even-field transfer gate pulses are applied to the vertical transfer paths 202 from time t6 as shown in FIG. 6E. As a result, signal charges in the photodiodes 201 corresponding to the even field are read out to the vertical CCD transfer paths 202 and then transferred to the horizontal CCD transfer path 203. In this case as well, the signal charges from two pixels arranged in the vertical direction are added together in the horizontal transfer path.

According to the first embodiment, as described above, the use of the mechanical shutter allows pixel signals to be read with each of odd and even fields. And moreover unnecessary charges are drained in the state where the shutter is closed. It therefore becomes possible to prevent unwanted charges which may cause smear and the like from being mixed as noise in an image signal.

In the imaging apparatus of the first embodiment, the exposure is set to ½ (1/N) the normal target exposure. This is intended to keep the image quality (S/N ratio) as good as in the normal shooting mode. Otherwise, any other exposure setting may be made. An example in this case will be described below as a second embodiment. The second embodiment differs from the first embodiment only in that:
(1) The target value of exposure control is ¼ (1/N$^2$).
(2) The digital operation in the succeeding stage is addition rather than addition and averaging (the operation on two pixels separated by one pixel remains unchanged).

In the second embodiment, the signal level at the output of the imaging device is ½ the signal level in the normal mode. The signal level is restored to the normal level through the digital operation. Thus, that the exposure is allowed to be ¼ the normal value means that four times as high sensitivity is obtained. However, this corresponds to increasing of the gain of the digital circuit system and hence both analog noise and quantization noise increase in comparison with the first embodiment.

However, since the exposure value for the imaging device is set to ¼ the target value in the normal mode in which no pixel addition is performed and this satisfies the condition of not more than 1/N (N is the number of vertically-arranged pixels to be added together), the amount of charge at the time of addition in the device will not exceed the amount of charge for one pixel in the normal mode and there will not arise at least a new problem of signal saturation in the imaging device (for subject brightness level lower than the normal).

Considering only a shot noise corresponding to one of noise components, if the exposure value is set to 1/N time the amount of charge and no pixel signals are added, a generation of the noise is $$1/\sqrt{N}$$

time the noise level 1 which is generated when the normal exposure value is set to 1. If the exposure value is set to 1/N time the amount of charge and four pixel signals (N=4) are added, a generation of the noise is 1

$$(=1/\sqrt{N} \times \sqrt{N})$$

which is same level as that of the normal exposure value. Thus, the four additions of the pixel signals can maintain the S/N at the time of normal exposure.

The present invention is not to be limited to the embodiments described so far. Although the present invention has been described as using a CCD array as the imaging device, any other charge transfer device (CTD), such as a bucket brigade device (BBD) or a charge injection device (CID), may be used. The color filter need not be limited to an R, G and B primary color filters. Instead, a complementary color filter such as C, M and Y color filters may be used. The pixels to be added together need not be limited to two pixels in the vertical direction and two pixels in the horizontal direction. The number of pixels to be added together in each direction may be set according to specifications. The number of pixels to be added together in each direction may differ from that in the other direction.

In the embodiments, the mechanical shutter and the interlaced reading are used in combination particularly for the color imaging device with the Bayer arrangement color filter. It is evident that, even with no such measures, the present invention can be readily applied to single-plate color imaging apparatuses with a vertical stripe filter, multi-plate color imaging apparatuses, or monochrome imaging apparatuses.

The present invention can be applied not only to a digital still camera but also to any other type of imaging apparatus including a movie camera. The present invention may be practiced or embodied in still other ways without departing from the scope and spirit thereof.

According to the present invention, as described above in detail, by performing pixel signal addition in the vertical direction through driving means in the imaging device and pixel addition in the horizontal direction through external operations means outside of the imaging device, the external circuit is required to perform one-dimensional addition operation only, allowing signal processing to be simplified significantly in comparison with two-dimensional addition operation. Also, the pixel addition in the vertical direction within the imaging device allows the frame rate to be increased. That is, the sensitivity and the frame rate can be increased through pixel addition without need of complex signal processing.

In addition, the occurrence of poor image quality due to a degradation in S/N ratio and new signal saturation in the imaging device can be suppressed effectively by controlling the target exposure value properly in the exposure control means.

With the Bayer arrangement imaging device in particular, the interlaced frame readout allows the addition of pixels arranged in the vertical direction to be performed within the horizontal transfer path and the addition of pixels arranged in the horizontal direction to be performed in the external circuit to the imaging device. It therefore becomes possible to add together signals from multiple pixels arranged in the vertical and horizontal directions with the above advantages.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for taking an image of a subject comprising:

mode setting means for setting either of first and second modes;

an interline transfer imaging device having photosensitive sections each of which is composed of a plurality of pixels arranged in the vertical direction and responsive to incident light for producing charges, vertical transfer paths arranged alternately with the photosensitive sections in the horizontal direction, each of the vertical transfer paths being arranged to vertically transfer signal charges produced from a corresponding one of the photosensitive sections, and a horizontal transfer path for transferring signal charges transferred by the vertical transfer paths to outside of the imaging device;

driving means for driving the imaging device, which, in the first mode, produces first vertical drive signals that cause signal charges produced in each of the photosensitive sections to be transferred from a corresponding one of the vertical transfer paths to the horizontal transfer path at a first normal transfer rate and which, in the second mode, produces second vertical drive signals that cause signal charges produced in each of the photosensitive sections to be transferred from a corresponding one of the vertical transfer paths to the horizontal transfer path at a second transfer rate N times the first normal transfer rate so that pixel signals from each of the vertical transfer paths are added together in the horizontal transfer path, and, in each of the first and second modes, produces horizontal transfer signals that cause signal charges in the horizontal transfer path to be transferred to outside of the imaging device as a line of image signal;

processing means for processing the image signal read out of the horizontal transfer path, the processing means, in the first mode, performing processing on the image signal output from the horizontal transfer path for conversion into image data, and, in the second mode, subjecting pixel signals in image signal from the horizontal transfer path which correspond to pixels arranged in the horizontal direction to addition and averaging and processing the resulting image signal for conversion into image data; and further comprising exposure control means for controlling the amount of light falling on the imaging device, the exposure control means setting a target exposure value in the second mode to 1/N a target value in the first mode.

2. The apparatus according to claim 1, wherein the number of pixel signals is added together in the second mode by the drive means, the same number of pixel signals is added together in the second mode by the processing means, and the number is an integer N of not less than two.

3. The apparatus according to claim 1, wherein in the second mode the driving drives the vertical transfer paths in the imaging device at twice the rate in the first mode so that signal charges from two pixels arranged in the vertical direction in each of the photosensitive sections are added together in the horizontal transfer path.

4. The apparatus according to claim 1, wherein, in the second mode, the output of the addition operation means is substantially decreased in a level by a factor of N and then subjected to the same signal processing as in the first mode.

5. An apparatus for taking an image of a subject comprising:

mode setting means for setting either of first and second modes;

an interline transfer imaging device having photosensitive sections each of which is composed of a plurality of pixels arranged in the vertical direction and responsive to incident light for producing charges, vertical transfer paths arranged alternately with the photosensitive sections in the horizontal direction, each of the vertical transfer paths being arranged to vertically transfer signal charges produced in a corresponding one of the photosensitive sections, a horizontal transfer path for transferring signal charges transferred by the vertical transfer paths to outside of the imaging device, and Bayer-arranged color filter elements each of which is aligned with a corresponding one of the pixels of the photosensitive sections;

driving means for driving the imaging device, which, in the first mode, produces first vertical drive signals that cause signal charges produced in each of the photosensitive sections to be transferred from the vertical transfer paths to the horizontal transfer path at a first normal transfer rate and which, in the second mode, produces second vertical drive signals that cause signal charges produced in each of the photosensitive sections to be transferred from the vertical transfer paths to the horizontal transfer path at a second transfer rate N times the first normal transfer rate so that pixel signals from pixels corresponding to color filter elements of the same color in each of the photosensitive sections are added together in the horizontal transfer path, and, in each of the first and second modes, produces horizontal transfer signals that cause signal charges in the horizontal transfer path to be transferred to outside of the imaging device as a line of image signal;

processing means for processing pixel signals read out of the horizontal transfer path, the processing means, in the first mode, performing processing on the image signal output from the horizontal transfer path for conversion into image data, and, in the second mode, subjecting pixel signals from the horizontal transfer path which are produced from pixels corresponding to color filter elements of the same color and arranged in the horizontal direction to addition and averaging and processing the resulting image signal for conversion into image data;

wherein the number of pixel signals is added together in the second mode by the drive means, the same number of pixel signals is added together in the second mode by the processing means, and the number is an integer N of not less than two; and exposure control means for controlling the amount of light falling on the imaging device, the exposure control means setting a target exposure value in the second mode to 1/N a target value in the first mode.

6. The apparatus according to claim 5, wherein in the second mode the driving means drives the vertical transfer paths in the imaging device at twice the rate in the first mode so that signal charges from two pixels arranged in the vertical direction in each of the photosensitive sections are added together in the horizontal transfer path.

7. The apparatus according to claim 5, wherein, in the second mode, the output of the addition operation means is substantially decreased in a level by a factor of N and then subjected to the same signal processing as in the first mode.

8. An electronic imaging apparatus capable of adding pixel signal and outputting the added pixel signal, comprising:

a solid state imaging device including matrix array of pixels for generating the pixel signals, which is provided with color filters of the Bayer arrangement, the pixel signals being selectively output at a normal transfer rate or at N time the normal transfer rate, wherein the N is not smaller than 2 and is integer;

image processing circuit including A/D converter for converting the pixel signal to digital signals and digital processor for processing the digital signal;

controlling means for controlling said solid state imaging device as to add the pixel signal from some of the pixels of the same color which are relatively closed and arranged along the row of the matrix array and said image processing circuit to add the pixel signal from some of the pixels of the same color which are relatively closed and arranged along the column of the matrix array; and exposure control means for controlling the amount of light falling on the imaging device, the exposure control means setting a target exposure value on adding the pixel signal to 1/N the target value without addition.

9. The apparatus according to claim 8, wherein said solid state imaging device is interlace read out type.

10. The apparatus according to claim 8, wherein said solid state imaging device is interline charge transfer type.

* * * * *